United States Patent
Yu et al.

(10) Patent No.: US 11,834,724 B2
(45) Date of Patent: Dec. 5, 2023

(54) LIGHT-COLORED POLYCARBOXYLATED POLYSACCHARIDE TANNING AGENT, AND PREPARATION METHOD AND USE THEREOF

(71) Applicant: SICHUAN UNIVERSITY, Chengdu (CN)

(72) Inventors: Yue Yu, Chengdu (CN); Yanan Wang, Chengdu (CN); Bi Shi, Chengdu (CN); Xueru Guo, Yulin (CN); Jianfei Zhou, Chengdu (CN); Yunhang Zeng, Chengdu (CN); Wenhua Zhang, Chengdu (CN); Mingrong Cao, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 17/687,715

(22) Filed: Mar. 7, 2022

(65) Prior Publication Data

US 2022/0251672 A1    Aug. 11, 2022

Related U.S. Application Data

(63) Continuation of application No. PCT/CN2021/117900, filed on Sep. 13, 2021.

(30) Foreign Application Priority Data

Feb. 8, 2021    (CN) .......................... 202110178497.6

(51) Int. Cl.
  *C14C 3/22*     (2006.01)
  *C08B 31/18*    (2006.01)
  *C08K 5/14*     (2006.01)
  *C08K 5/1535*   (2006.01)
  *C08K 3/30*     (2006.01)

(52) U.S. Cl.
  CPC .............. *C14C 3/22* (2013.01); *C08B 31/185* (2013.01); *C08K 3/30* (2013.01); *C08K 5/14* (2013.01); *C08K 5/1535* (2013.01); *C08K 2003/3072* (2013.01)

(58) Field of Classification Search
  None
  See application file for complete search history.

(56) References Cited

U.S. PATENT DOCUMENTS 2,029,322 A * 2/1936 Jaeger ........................ C14C 3/08
                                                      528/265

FOREIGN PATENT DOCUMENTS

| CN | 101575652 A | 11/2009 |
| CN | 102747173 A | * 10/2012 |
| CN | 102747173 A | 10/2012 |
| CN | 102747173 B | 10/2014 |
| CN | 106478884 A | 3/2017 |
| CN | 107119154 A | 9/2017 |
| CN | 107119154 B | * 4/2019 ........... C08B 31/185 |
| CN | 107119154 B | 4/2019 |
| CN | 110218822 A | 9/2019 |
| CN | 111088409 A | 5/2020 |
| CN | 112831617 A | 5/2021 |
| EP | 2607500 A1 | 6/2013 |

OTHER PUBLICATIONS

CN-107119154-B, Apr. 2019, Machine translation (Year: 2019).*
CN-102747173-A, Oct. 2012, Machine translation (Year: 2012).*
Li Jie, et al., Preparation and Prospect of Furfural Products and Its Application in the Leather Industry, Leather and Chemicals, 2009, pp. 9-15, vol. 26, No. 6.
Yu Yue, et al., Effect of Catalyst on Structure of Hydrogen Peroxide Oxidized Starch and Its Performance as a Ligand in Zirconium Tanning of Leather, Fine Chemicals, 2018, pp. 1928-1934, vol. 35, No. 11.
Yue Yu, et al., Preparation of highly oxidized starch using hydrogen peroxide and its application as a novel ligand for zirconium tanning of leather, Carbohydrate Polymers, 2017, pp. 823-829, vol. 174.
Wang Xue-Chuan, et al., The Preparation of High-oxidized Starch and its Properties of Tannage, Leather Science and Engineering, 2013, pp. 5-8,13, vol. 23, No. 2.

* cited by examiner

*Primary Examiner* — Satya B Sastri
(74) *Attorney, Agent, or Firm* — Bayramoglu Law Offices LLC

(57) ABSTRACT

A light-colored polycarboxylated polysaccharide tanning agent, and a preparation method and use thereof are provided. The light-colored polycarboxylated polysaccharide tanning agent includes the following raw materials: a polysaccharide, an organic solvent, a catalyst, and hydrogen peroxide. Based on a weight of the polysaccharide, a weight of the organic solvent accounts for 1 wt % to 15 wt %, a weight of the catalyst accounts for 0.05 wt % to 2 wt %, and a weight of the hydrogen peroxide accounts for 30 wt % to 80 wt %. The preparation method provided by the present disclosure adopts a two-phase solution system. Compared with the existing preparation technologies, the preparation method of the present disclosure can efficiently extract and remove colored substances produced during an oxidation process, and can timely block a polymerization reaction of the colored substances with an oxidized polysaccharide, such as to significantly reduce a chromaticity of an oxidized product.

8 Claims, No Drawings

LIGHT-COLORED POLYCARBOXYLATED POLYSACCHARIDE TANNING AGENT, AND PREPARATION METHOD AND USE THEREOF

CROSS REFERENCE TO THE RELATED APPLICATIONS

This application is a continuation application of the national phase entry of International Application No. PCT/CN2021/117900, filed on Sep. 13, 2021, which is based upon and claims priority to Chinese Patent Application No. 202110178497.6, filed on Feb. 8, 2021, the entire contents of which are incorporated herein by reference.

TECHNICAL FIELD

The present disclosure relates to the technical field of tanning agents for leather and fur, and in particular to a light-colored polycarboxylated polysaccharide tanning agent, and a preparation method and use thereof.

BACKGROUND

Polysaccharide is a macromolecular compound formed by linking more than ten monosaccharides through glycosidic bonds, which is widely available, renewable, safe, non-toxic, and cheap, and thus is an ideal raw material for preparing an ecological tanning agent. When a polysaccharide is under the strong oxidation of an oxidant such as hydrogen peroxide, hydroxyl in sugar units will be oxidized into carboxyl and glycosidic bonds will be broken. Therefore, products of deep oxidative degradation of polysaccharides can be used in combination with non-chrome metal salts for leather or fur tanning.

In documents (Yu, Y, Wang, Y. N., Ding, W., et al. Effect of catalyst on structure of hydrogen peroxide oxidized starch and its performance as a ligand in zirconium tanning of leather, Fine Chemicals, 2018, 35 (11): 1928-1934; and Yu, Y., Wang, Y. N., Ding, W., et al. Preparation of highly-oxidized starch using hydrogen peroxide and its application as a novel ligand for zirconium tanning of leather, Carbohydrate Polymer, 2017, 174, 823-829), a method for preparing a deeply-oxidized starch through catalytic oxidation of a starch at a high temperature (70° C. to 98° C.) and a large hydrogen peroxide amount (60 wt %) is reported. A product obtained by this method has a dark color, and thus will affect the color and appearance of a leather or fur when used for tanning, which limits its application in the manufacture of chrome-free leathers. Chinese patent CN107119154B "Preparation method of broad-range multifunctional polysaccharide-based ligand-metal complex tanning agent" discloses a method for preparing an oxidized polysaccharide through catalytic oxidation at a high temperature (120° C. to 160° C.), a high pressure (0.2 MPa to 0.6 MPa), and a high hydrogen peroxide amount (40 wt % to 100 wt %), which has the problem that the high temperature and high pressure conditions are more likely to promote the formation of colored substances. In the document (Wang, X. C., Li, F. H., Qiang, T. T., et al. The preparation of high-oxidized starch and its properties of tannage, Leather Science and Engineering, 2013, 23 (2): 5-8) and the Chinese patent CN102747173B "Preparation method of aluminum-oxidized Starch Complex Tanning Agent", a method for preparing a deeply-oxidized starch through catalytic oxidation of a starch with concentrated nitric acid and ammonium metavanadate under heating is reported, and a deeply-oxidized starch obtained is also rich in colored substances and has a dark color. The oxidized polysaccharide has a dark color because the polysaccharide will be degraded under strong oxidation to produce monosaccharide compounds such as glucose, the monosaccharide compounds will be dehydrated and converted into furfural compounds under heating or weak acid conditions, and the furfural compounds will further self-polymerize or polymerize with the oxidized polysaccharide to form colored substances.

SUMMARY

In order to solve the problems in the background art, the present disclosure provides a light-colored polycarboxylated polysaccharide tanning agent, and a preparation method and use thereof. The light-colored polycarboxylated polysaccharide tanning agent prepared by the method of the present disclosure has a light color, and will not adversely affect a color of a tanned leather or fur when used in combination with a non-chrome metal salt.

In order to achieve the above objective, the present disclosure adopts a first technical solution:

A light-colored polycarboxylated polysaccharide tanning agent is provided, where the light-colored polycarboxylated polysaccharide tanning agent is prepared from the following raw materials: a polysaccharide, an organic solvent, a catalyst, and hydrogen peroxide; and based on a weight of the polysaccharide, a weight of the organic solvent accounts for 1 wt % to 15 wt %, a weight of the catalyst accounts for 0.05 wt % to 2 wt %, and a weight of the hydrogen peroxide accounts for 30 wt % to 80 wt %.

Further, the organic solvent may be any one or more from the group consisting of tetrahydrofuran (THF), ethyl acetate, and methyl isobutyl ketone (MIBK).

Further, the polysaccharide may be any one from the group consisting of starch, dextrin, cellulose, sodium carboxymethyl cellulose (CMC-Na), and sodium carboxymethyl starch (CMS-Na).

Further, the catalyst may be any one or more from the group consisting of copper sulfate, ferrous sulfate, and ferric sulfate.

Further, the light-colored polycarboxylated polysaccharide tanning agent may further include a neutral salt at a weight accounting for 0 wt % to 30 wt % of the weight of the polysaccharide; and the neutral salt may be any one or more from the group consisting of sodium chloride, potassium chloride, sodium sulfate, and potassium nitrate.

Further, the light-colored polycarboxylated polysaccharide tanning agent may have a carboxyl content of 5.2 mmol/g to 13.1 mmol/g, a weight-average molecular weight of 350 g/mol to 6,000 g/mol, and a chromaticity of 1 to 50.

The present disclosure adopts a second technical solution:

A preparation method of the light-colored polycarboxylated polysaccharide tanning agent is provided, including:
  preparing a polysaccharide aqueous solution with a concentration of 20% to 60%;
  adding the catalyst, the organic solvent, and the hydrogen peroxide to the polysaccharide aqueous solution, and conducting an oxidation reaction at 50° C. to 90° C. for 0.5 hours to 4 hours to obtain an oxidized polysaccharide solution; and
  adding the neutral salt to the oxidized polysaccharide solution, thoroughly stirring, allowing a resulting mixture to stand for 30 min such that an aqueous phase and an organic phase are fully separated, and discarding the organic phase with colored substances to obtain the light-colored polycarboxylated polysaccharide tanning agent.

The present disclosure adopts a third technical solution:

Use of the light-colored polycarboxylated polysaccharide tanning agent according to the first technical solution or a light-colored polycarboxylated polysaccharide tanning agent prepared by the method according to the second technical solution in leather or fur tanning is provided.

Further, the leather or fur tanning may include the following steps:

placing a pickled fur obtained by a conventional process in a drum, adding 80 wt % to 200 wt % of a pickling liquor, 4 wt % to 21 wt % of a non-chrome metal salt, and 1 wt % to 4 wt % of the polycarboxylated polysaccharide tanning agent based on a weight of the pickled fur, and allowing the drum to rotate for 2 hours to 6 hours; and adjusting a pH to 3.8 to 4.5 with magnesium oxide or sodium bicarbonate, adjusting a temperature to 40° C., and allowing the drum to rotate for 2 hours to obtain a tanned leather, where the polycarboxylated polysaccharide tanning agent is added at an amount calculated based on a content of effective substances in the tanning agent; or placing a pickled fur obtained by a conventional process in a drum or a paddle, adding 400 wt % to 600 wt % of a pickling liquor based on a weight of the pickled fur, and 13 g/L to 32 g/L of a non-chrome metal salt and 2 g/L to 6 g/L of the polycarboxylated polysaccharide tanning agent based on a volume of water added, and allowing the drum or the paddle to rotate or paddle for 2 hours to 8 hours; and adjusting a pH to 3.6 to 4.2 with magnesium oxide or sodium bicarbonate, adjusting a temperature to 40° C., and allowing the drum or the paddle to rotate or paddle for 2 hours to obtain a tanned fur, where the polycarboxylated polysaccharide tanning agent is added at an amount calculated based on a content of effective substances in the tanning agent.

Further, the non-chrome metal salt may be any one or more from the group consisting of aluminum sulfate, zirconium sulfate, and titanium sulfate.

The principle that the present disclosure can prepare the light-colored polycarboxylated polysaccharide tanning agent is as follows: An organic solvent similar in structure or polarity to furfural substances is added to an aqueous phase to form a two-phase solution system, such that small-molecule furfural substances produced during a reaction can be rapidly dissolved in an organic phase, while an oxidized polysaccharide is dissolved in the aqueous phase, which timely blocks the polymerization of the small-molecule furfural substances with the oxidized polysaccharide to form macromolecular colored substances. Then, the aqueous phase and the organic phase are separated, and the organic phase with the small-molecule furfural substances and polymers thereof is discarded, such that a decolorization effect is achieved and the light-colored polycarboxylated polysaccharide tanning agent can be obtained.

The light-colored polycarboxylated polysaccharide tanning agent of the present disclosure is prepared in a two-phase solution system, where a catalytic oxidation system composed of a catalyst and hydrogen peroxide can achieve deep oxidative degradation on a polysaccharide, such that the polycarboxylated polysaccharide tanning agent has sufficient carboxyl to coordinate with a non-chrome metal salt, and has a molecular weight low enough to ensure that the tanning agent can uniformly penetrate into the fur. More importantly, the organic solvent can efficiently extract colored substances produced during an oxidation reaction, such that the polycarboxylated polysaccharide tanning agent has a light color and will not adversely affect a color of a tanned leather or fur.

Compared with the prior art, the present disclosure has the following beneficial effects:

The light-colored polycarboxylated polysaccharide tanning agent provided by the present disclosure significantly reduces a chromaticity of an oxidized product. The preparation method of the light-colored polycarboxylated polysaccharide tanning agent provided by the present disclosure adopts a two-phase solution system. Compared with the existing preparation technologies for oxidized polysaccharide tanning agents, the preparation method of the present disclosure can efficiently extract and remove colored substances produced during an oxidation process, and can timely block a polymerization reaction of the colored substances with an oxidized polysaccharide, such as to significantly reduce a chromaticity of an oxidized product.

The catalytic oxidation system composed of a catalyst and hydrogen peroxide used in the present disclosure can ensure that the oxidized polysaccharide has a sufficient carboxyl content (5.2 mmol/g to 13.1 mmol/g), and shows excellent coordination capability with non-chrome metal salts, such that the oxidized polysaccharide tanning agent has excellent application effects in leather or fur tanning.

DETAILED DESCRIPTION OF THE EMBODIMENTS

The present disclosure is described in detail below with reference to embodiments. It should be pointed out that the embodiments are merely used to further explain the present disclosure, rather than to limit the protection scope of the present disclosure. Those skilled in the art may make some non-essential improvements and adjustments to the present disclosure according to the content of the present disclosure.

In the following examples and comparative examples, a determination method of a carboxyl content in an oxidized polysaccharide tanning agent is as follows:

According to a solid content of an oxidized polysaccharide tanning agent, a specified mass (m) of the oxidized polysaccharide tanning agent is weighed and prepared into an aqueous solution, then the aqueous solution is loaded on a cation exchange column (which is packed with an Amberlite IR120 hydrogenous strong-acid cation-exchange resin, and has a diameter of 35 mm and a length of 370 mm), and with ultrapure water as a mobile phase, elution is conducted at a constant rate (1.7 mL/min) at room temperature. 250 mL of an eluent is collected and titrated with a NaOH standard solution (concentration $C_{NaOH}$) on a potentiometric titrator to a pH of 8.3, and a volume of the NaOH standard solution consumed by the sample ($V_{S-NaOH}$) is recorded. In addition, an equal mass of the polysaccharide is weighed and prepared into an aqueous solution for blank titration, and a volume of the NaOH standard solution ($V_{B-NaOH}$) consumed by the blank is recorded. The carboxyl content is calculated according to the following formula:

$$\text{Carboxyl content (mmol/g)} = \frac{C_{NaOH} \times (V_{S-NaOH} - V_{B-NaOH})}{m}$$

In the following examples and comparative examples, a determination method of a weight-average molecular weight in an oxidized polysaccharide tanning agent is as follows:

An oxidized polysaccharide tanning agent is prepared with distilled water into a solution with a mass concentration of 50 mg/mL, and then the solution is filtered through a 0.25 µm microporous membrane, and then subjected to gel permeation chromatography analysis. Chromatographic conditions are as follows: injection volume: 100 µL, mobile phase $NaNO_3$ solution (0.1 mol/L), TSK-gel GMPWXL chromatographic column (7.8 mm×300 mm), and flow rate: 0.6 mL/min.

In the following examples and comparative examples, a determination method of a chromaticity of an oxidized polysaccharide tanning agent is as follows:

An oxidized polysaccharide tanning agent solution is diluted with distilled water by 25 times, distilled water is used for blank correction, and a colorimeter is used to determine a colorimetric value of the oxidized polysaccharide tanning agent through platinum-cobalt colorimetry.

Example 1

Preparation of a Light-Colored Polycarboxylated Starch Tanning Agent:

In parts by weight, 40 parts of starch, 100 parts of water, 0.04 part of ferrous sulfate, and 3.2 parts of THF were placed in a reactor, and 20 parts of hydrogen peroxide were added dropwise to allow an oxidation reaction at 70° C. for 4 hours to obtain an oxidized starch solution; 6 parts of sodium chloride were added to the oxidized starch solution, and a resulting mixture was thoroughly stirred and stood for 30 min, such that an aqueous phase and an organic phase were fully separated; and the organic phase with colored substances was discarded to finally obtain the aqueous phase, which was the light-colored polycarboxylated starch tanning agent.

In this step, a carboxyl content, a weight-average molecular weight, and a chromaticity of the oxidized starch tanning agent were determined, and results are shown in Table 1.

Use of the Light-Colored Polycarboxylated Starch Tanning Agent in Leather Tanning:

A pickled fur obtained by a conventional process was placed in a drum, 140 wt % of a pickling liquor, 13 wt % of aluminum sulfate, and 3 wt % of the oxidized starch tanning agent were added based on a weight of the pickled fur, and the drum was allowed to rotate for 4 hours; and a pH was adjusted to 3.8 to 4.5 with magnesium oxide or sodium bicarbonate, a temperature was adjusted to 40° C., and the drum was allowed to rotate for 2 hours to obtain a tanned leather, where the oxidized starch tanning agent was added at an amount calculated based on a content of effective substances in the tanning agent.

Comparative Example 1

In parts by weight, 40 parts of starch, 100 parts of water, and 0.04 part of ferrous sulfate were placed in a reactor, and 20 parts of hydrogen peroxide were added dropwise to allow an oxidation reaction at 70° C. for 4 hours to obtain a dark-colored polycarboxylated starch tanning agent.

Test indices and a use method of this oxidized starch tanning agent were the same as in Example 1, and test results are shown in Table 1.

Comparative Example 2

In parts by weight, 40 parts of starch, 100 parts of water, and 3.2 parts of THF were placed in a reactor, and 20 parts of hydrogen peroxide were added dropwise to allow an oxidation reaction at 70° C. for 4 hours to obtain a light-colored low-carboxylated starch tanning agent.

Test indices and a use method of this oxidized starch tanning agent were the same as in Example 1, and test results are shown in Table 1.

Comparative Example 3

In parts by weight, 40 parts of starch, 100 parts of water, 0.04 part of ferrous sulfate, and 3.2 parts of THF were placed in a reactor, and an oxidation reaction was conducted at 70° C. for 4 hours to obtain a light-colored low-carboxylated starch tanning agent.

Test indices and a use method of this oxidized starch tanning agent were the same as in Example 1, and test results are shown in Table 1.

Table 1 Comparison of carboxyl content, weight-average molecular weight, and chromaticity among the oxidized starch tanning agents

| | Carboxyl content (mmol/g) | Weight-average molecular weight (g/mol) | Chromaticity |
|---|---|---|---|
| Example 1 | 9.2 | 3372 | 24 |
| Comparative Example 1 | 9.0 | 3267 | 500 |
| Comparative Example 2 | 3.7 | 86436 | 18 |
| Comparative Example 3 | 0.1 | 2734600 | 1 |

It can be seen from Table 1 that the carboxyl content and weight-average molecular weight of the oxidized starch tanning agent provided in Example 1 of the present disclosure are relatively close to that of the tanning agent prepared by the method provided in Comparative Example 1, but the chromaticity is far lower than that of the tanning agent in Comparative Example 1. It indicates that the organic solvent can effectively remove the colored substances in the solution without affecting an oxidation degree of the polysaccharide, thereby significantly reducing the chromaticity of the tanning agent. In addition, the carboxyl content of the oxidized starch tanning agent provided by the present disclosure is significantly higher than that of the tanning agents prepared in Comparative Examples 2 and 3, while the weight-average molecular weight is significantly lower than that of the tanning agents prepared in Comparative Examples 2 and 3, such that the oxidized starch tanning agent of the present disclosure can effectively coordinate with non-chrome metal salts and uniformly penetrate into the fur to play a tanning role. It can be seen that the catalytic oxidation system composed of a catalyst and hydrogen peroxide can effectively improve an oxidative degradation degree of starch and ensure that the tanning agent is suitable for the coordination tanning of a leather. In summary, the organic solvent, catalyst, and hydrogen peroxide used in the present disclosure are all indispensable for the preparation of the light-colored polycarboxylated polysaccharide tanning agent.

Example 2

Preparation of a Light-Colored Polycarboxylated Dextrin Tanning Agent:

In parts by weight, 20 parts of dextrin, 100 parts of water, 0.02 part of ferric sulfate, and 1.6 parts of ethyl acetate were placed in a reactor, and 16 parts of hydrogen peroxide were added dropwise to allow an oxidation reaction at 70° C. for 0.5 hours to obtain an oxidized dextrin solution; the oxidized dextrin solution was thoroughly stirred and stood for 30 min, such that an aqueous phase and an organic phase were fully separated; and the organic phase with colored substances was discarded to finally obtain the aqueous phase, which was the light-colored polycarboxylated dextrin tanning agent.

The oxidized dextrin tanning agent in this example had a carboxyl content of 5.7 mmol/g, a weight-average molecular weight of 1,495 g/mol, and a chromaticity of 45.

Use of the Light-Colored Polycarboxylated Dextrin Tanning Agent in Leather Tanning:

A pickled fur obtained by a conventional process was placed in a drum, 200 wt % of a pickling liquor, 21 wt % of zirconium sulfate, and 4 wt % of the oxidized dextrin tanning agent were added based on a weight of the pickled fur, and the drum was allowed to rotate for 6 hours; and a pH was adjusted to 3.8 to 4.5 with magnesium oxide or sodium bicarbonate, a temperature was adjusted to 40° C., and the drum was allowed to rotate for 2 hours to obtain a tanned leather, where the oxidized dextrin tanning agent was added at an amount calculated based on a content of effective substances in the tanning agent.

Example 3

Preparation of a Light-Colored Polycarboxylated Cellulose Tanning Agent:

In parts by weight, 60 parts of cellulose, 100 parts of water, 0.06 part of copper sulfate, and 4.8 parts of THF were placed in a reactor, and 18 parts of hydrogen peroxide were added dropwise to allow an oxidation reaction at 70° C. for 2 hours to obtain an oxidized cellulose solution; 18 parts of potassium chloride were added to the oxidized cellulose solution, and a resulting mixture was thoroughly stirred and stood for 30 min, such that an aqueous phase and an organic phase were fully separated; and the organic phase with colored substances was discarded to finally obtain the aqueous phase, which was the light-colored polycarboxylated cellulose tanning agent.

The oxidized cellulose tanning agent in this example had a carboxyl content of 11.8 mmol/g, a weight-average molecular weight of 1,115 g/mol, and a chromaticity of 10.

Use of the Light-Colored Polycarboxylated Cellulose Tanning Agent in Leather Tanning:

A pickled fur obtained by a conventional process was placed in a drum, 200 wt % of a pickling liquor, 13 wt % of zirconium sulfate, and 3 wt % of the oxidized cellulose tanning agent were added based on a weight of the pickled fur, and the drum was allowed to rotate for 6 hours; and a pH was adjusted to 3.8 to 4.5 with magnesium oxide or sodium bicarbonate, a temperature was adjusted to 40° C., and the drum was allowed to rotate for 2 hours to obtain a tanned leather, where the oxidized cellulose tanning agent was added at an amount calculated based on a content of effective substances in the tanning agent.

Example 4

Preparation of a Light-Colored Polycarboxylated CMC-Na Tanning Agent:

In parts by weight, 20 parts of CMC-Na, 100 parts of water, 0.001 part of copper sulfate, and 0.2 part of MIBK were placed in a reactor, and 6 parts of hydrogen peroxide were added dropwise to allow an oxidation reaction at 90° C. for 2 hours to obtain an oxidized CMC-Na solution; 6 parts of sodium sulfate were added to the oxidized CMC-Na solution, and a resulting mixture was thoroughly stirred and stood for 30 min, such that an aqueous phase and an organic phase were fully separated; and the organic phase with colored substances was discarded to finally obtain the aqueous phase, which was the light-colored polycarboxylated CMC-Na tanning agent.

The oxidized CMC-Na tanning agent in this example had a carboxyl content of 5.2 mmol/g, a weight-average molecular weight of 6,000 g/mol, and a chromaticity of 50.

Use of the Light-Colored Polycarboxylated CMC-Na Tanning Agent in Fur Tanning:

A pickled fur obtained by a conventional process was placed in a drum or a paddle, 600 wt % of a pickling liquor based on a weight of the pickled fur, and 13 g/L of zirconium sulfate and 2 g/L of the polycarboxylated CMC-Na tanning agent based on a volume of water added were added, and the drum or the paddle was allowed to rotate or paddle for 8 hours; and a pH was first adjusted to 3.0 with magnesium oxide and then adjusted to 3.6 to 4.2 with magnesium oxide or sodium bicarbonate, a temperature was adjusted to 40° C., and the drum or the paddle was allowed to rotate or paddle for 2 hours to obtain a tanned fur, where the polycarboxylated CMC-Na tanning agent was added at an amount calculated based on a content of effective substances in the tanning agent.

Example 5

Preparation of a Light-Colored Polycarboxylated CMS-Na Tanning Agent:

In parts by weight, 60 parts of CMS-Na, 100 parts of water, 0.003 part of ferrous sulfate, and 0.6 part of MIBK were placed in a reactor, and 30 parts of hydrogen peroxide were added dropwise to allow an oxidation reaction at 90° C. for 4 hours to obtain an oxidized CMS-Na solution; 9 parts of potassium nitrate were added to the oxidized CMS-Na solution, and a resulting mixture was thoroughly stirred and stood for 30 min, such that an aqueous phase and an organic phase were fully separated; and the organic phase with colored substances was discarded to finally obtain the aqueous phase, which was the light-colored polycarboxylated CMS-Na tanning agent.

The oxidized CMS-Na tanning agent in this example had a carboxyl content of 13.1 mmol/g, a weight-average molecular weight of 350 g/mol, and a chromaticity of 1.

Use of the Light-Colored Polycarboxylated CMS-Na Tanning Agent in Fur Tanning:

A pickled fur obtained by a conventional process was placed in a drum or a paddle, 400 wt % of a pickling liquor based on a weight of the pickled fur, and 18 g/L of titanium sulfate and 4 g/L of the polycarboxylated CMS-Na tanning agent based on a volume of water added were added, and the drum or the paddle was allowed to rotate or paddle for 4 hours; and a pH was first adjusted to 3.0 with magnesium oxide and then adjusted to 3.6 to 4.2 with magnesium oxide or sodium bicarbonate, a temperature was adjusted to 40° C., and the drum or the paddle was allowed to rotate or paddle for 2 hours to obtain a tanned fur, where the polycarboxylated CMS-Na tanning agent was added at an amount calculated based on a content of effective substances in the tanning agent.

Example 6

Preparation of a Light-Colored Polycarboxylated Starch Tanning Agent:

In parts by weight, 40 parts of starch, 100 parts of water, 0.002 part of ferric sulfate, and 0.4 part of MIBK were placed in a reactor, and 32 parts of hydrogen peroxide were added dropwise to allow an oxidation reaction at 90° C. for 0.5 hours to obtain an oxidized starch solution; the oxidized starch solution was thoroughly stirred and stood for 30 min, such that an aqueous phase and an organic phase were fully separated; and the organic phase with colored substances was discarded to finally obtain the aqueous phase, which was the light-colored polycarboxylated starch tanning agent.

The oxidized starch tanning agent in this example had a carboxyl content of 8.6 mmol/g, a weight-average molecular weight of 2,319 g/mol, and a chromaticity of 10.

Use of the Light-Colored Polycarboxylated Starch Tanning Agent in Fur Tanning:

A pickled fur obtained by a conventional process was placed in a drum or a paddle, 500 wt % of a pickling liquor based on a weight of the pickled fur, and 32 g/L of zirconium sulfate and 6 g/L of the polycarboxylated starch tanning agent based on a volume of water added were added, and the drum or the paddle was allowed to rotate or paddle for 4 hours; and a pH was adjusted to 3.6 to 4.2 with magnesium oxide or sodium bicarbonate, a temperature was adjusted to 40° C., and the drum or the paddle was allowed to rotate or paddle for 2 hours to obtain a tanned fur, where the polycarboxylated starch tanning agent was added at an amount calculated based on a content of effective substances in the tanning agent.

Example 7

Preparation of a Light-Colored Polycarboxylated Dextrin Tanning Agent:

In parts by weight, 60 parts of dextrin, 100 parts of water, 0.12 part of ferric sulfate, and 9 parts of ethyl acetate were placed in a reactor, and 48 parts of hydrogen peroxide were added dropwise to allow an oxidation reaction at 50° C. for 0.5 hours to obtain an oxidized dextrin solution; the oxidized dextrin solution was thoroughly stirred and stood for 30 min, such that an aqueous phase and an organic phase were fully separated; and the organic phase with colored substances was discarded to finally obtain the aqueous phase, which was the light-colored polycarboxylated dextrin tanning agent.

The oxidized dextrin tanning agent in this example had a carboxyl content of 12.9 mmol/g, a weight-average molecular weight of 1,326 g/mol, and a chromaticity of 15.

Use of the Light-Colored Polycarboxylated Dextrin Tanning Agent in Leather Tanning:

A pickled fur obtained by a conventional process was placed in a drum, 80 wt % of a pickling liquor, 4 wt % of titanium sulfate, and 1 wt % of the oxidized dextrin tanning agent were added based on a weight of the pickled fur, and the drum was allowed to rotate for 2 hours; and a pH was adjusted to 3.8 to 4.5 with magnesium oxide or sodium bicarbonate, a temperature was adjusted to 40° C., and the drum was allowed to rotate for 2 hours to obtain a tanned leather, where the oxidized dextrin tanning agent was added at an amount calculated based on a content of effective substances in the tanning agent.

Example 8

Preparation of a Light-Colored Polycarboxylated Cellulose Tanning Agent:

In parts by weight, 40 parts of cellulose, 100 parts of water, 0.08 part of copper sulfate, and 6 parts of ethyl acetate were placed in a reactor, and 12 parts of hydrogen peroxide were added dropwise to allow an oxidation reaction at 50° C. for 2 hours to obtain an oxidized cellulose solution; 12 parts of sodium chloride were added to the oxidized cellulose solution, and a resulting mixture was thoroughly stirred and stood for 30 min, such that an aqueous phase and an organic phase were fully separated; and the organic phase with colored substances was discarded to finally obtain the aqueous phase, which was the light-colored polycarboxylated cellulose tanning agent.

The oxidized cellulose tanning agent in this example had a carboxyl content of 8.5 mmol/g, a weight-average molecular weight of 867 g/mol, and a chromaticity of 20.

Use of the Light-Colored Polycarboxylated Cellulose Tanning Agent in Fur Tanning:

A pickled fur obtained by a conventional process was placed in a drum or a paddle, 500 wt % of a pickling liquor based on a weight of the pickled fur, and 32 g/L of aluminum sulfate and 6 g/L of the polycarboxylated cellulose tanning agent based on a volume of water added were added, and the drum or the paddle was allowed to rotate or paddle for 2 hours; and a pH was adjusted to 3.6 to 4.2 with magnesium oxide or sodium bicarbonate, a temperature was adjusted to 40° C., and the drum or the paddle was allowed to rotate or paddle for 2 hours to obtain a tanned fur, where the polycarboxylated cellulose tanning agent was added at an amount calculated based on a content of effective substances in the tanning agent.

Example 9

Preparation of a Light-Colored Polycarboxylated CMS-Na Tanning Agent:

In parts by weight, 20 parts of CMS-Na, 100 parts of water, 0.04 part of ferrous sulfate, and 3 parts of ethyl acetate were placed in a reactor, and 10 parts of hydrogen peroxide were added dropwise to allow an oxidation reaction at 50° C. for 4 hours to obtain an oxidized CMS-Na solution; 3 parts of potassium chloride were added to the oxidized CMS-Na solution, and a resulting mixture was thoroughly stirred and stood for 30 min, such that an aqueous phase and an organic phase were fully separated; and the organic phase with colored substances was discarded to finally obtain the aqueous phase, which was the light-colored polycarboxylated CMS-Na tanning agent.

The oxidized CMS-Na tanning agent in this example had a carboxyl content of 6.3 mmol/g, a weight-average molecular weight of 3,647 g/mol, and a chromaticity of 40.

Use of the Light-Colored Polycarboxylated CMS-Na Tanning Agent in Leather Tanning:

A pickled fur obtained by a conventional process was placed in a drum, 140 wt % of a pickling liquor, 21 wt % of titanium sulfate, and 4 wt % of the oxidized CMS-Na tanning agent were added based on a weight of the pickled fur, and the drum was allowed to rotate for 2 hours; and a pH was adjusted to 3.8 to 4.5 with magnesium oxide or sodium bicarbonate, a temperature was adjusted to 40° C., and the drum was allowed to rotate for 2 hours to obtain a tanned leather, where the oxidized CMS-Na tanning agent was added at an amount calculated based on a content of effective substances in the tanning agent.

Finally, it should be noted that the above examples are merely intended to describe the technical solutions of the present disclosure, rather than to limit the present disclosure. Although the present disclosure is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present disclosure.

What is claimed is:

1. A light-colored polycarboxylated polysaccharide tanning agent having a carboxyl content of 5.2 mmol/g to 8.0 mmol/g, a weight-average molecular weight of 350 g/mol to 900 g/mol, and a chromaticity of 1 to 24 that is prepared by the following steps:
preparing a polysaccharide aqueous solution with a concentration of 20% to 60% by weight;
adding a catalyst, an organic solvent, and hydrogen peroxide to the polysaccharide aqueous solution;
conducting an oxidation reaction at 50° C. to 90° C. for 0.5 hours to 4 hours to obtain an oxidized polysaccharide solution; and
optionally adding a neutral salt to the oxidized polysaccharide solution, thoroughly stirring, then allowing a resulting mixture to stand for 30 min until an aqueous phase and an organic phase are fully separated, and discarding the organic phase with colored substances to obtain the light-colored polycarboxylated polysaccharide tanning agent,
wherein based on a weight of the polysaccharide in the polysaccharide aqueous solution, a weight of the organic solvent accounts for 1 wt % to 15 wt %, a weight of the catalyst accounts for 0.05 wt % to 2 wt %, a weight of the hydrogen peroxide accounts for 30 wt % to 80 wt %, and a weight of the neutral salt accounts for 0 wt % to 30 wt %;
wherein the organic solvent is at least one selected from the group consisting of tetrahydrofuran, ethyl acetate, and methyl isobutyl ketone;
wherein the neutral salt is at least one selected from the group consisting of sodium chloride, potassium chloride, sodium sulfate, and potassium nitrate, and
wherein the polysaccharide is one selected from the group consisting of dextrin, cellulose, and sodium carboxymethyl cellulose.

2. The light-colored polycarboxylated polysaccharide tanning agent according to claim 1, wherein the catalyst is at least one selected from the group consisting of copper sulfate, ferrous sulfate, and ferric sulfate.

3. A method of tanning leather or fur by applying the light-colored polycarboxylated polysaccharide tanning agent of claim 1 to the leather or fur.

4. The method according to claim 3, wherein the leather or fur tanning comprises the following steps:
placing a pickled fur obtained by a conventional process in a drum, based on a weight of the pickled fur, adding 80 wt % to 200 wt % of a pickling liquor, 4 wt % to 21 wt % of a non-chrome metal salt, and 1 wt % to 4 wt % of the light-colored polycarboxylated polysaccharide tanning agent to the drum, and allowing the drum to rotate for 2 hours to 6 hours; adjusting a pH to 3.8 to 4.5 with magnesium oxide or sodium bicarbonate, adjusting a temperature to 40° C., and allowing the drum to rotate for 2 hours to obtain a tanned leather, wherein the light-colored polycarboxylated polysaccharide tanning agent is added at an amount calculated based on a content of effective substances in the light-colored polycarboxylated polysaccharide tanning agent; or
placing a pickled fur obtained by a conventional process in a drum or a paddle, adding 400 wt % to 600 wt % of a pickling liquor based on a weight of the pickled fur, and 13 g/L to 32 g/L of a non-chrome metal salt and 2 g/L to 6 of the light-colored polycarboxylated polysaccharide tanning agent based on a volume of water added, and allowing the drum or the paddle to rotate or paddle for 2 hours to 8 hours; adjusting a pH to 3.6 to 4.2 with magnesium oxide or sodium bicarbonate, adjusting a temperature to 40° C., and allowing the drum or the paddle to rotate or paddle for 2 hours to obtain a tanned fur, wherein the light-colored polycarboxylated polysaccharide tanning agent is added at an amount calculated based on a content of effective substances in the light-colored polycarboxylated polysaccharide tanning agent.

5. The method according to claim 4, wherein the non-chrome metal salt is at least one selected from the group consisting of aluminum sulfate, zirconium sulfate, and titanium sulfate.

6. The method according to claim 3, wherein the organic solvent is at least one selected from the group consisting of tetrahydrofuran, ethyl acetate, and methyl isobutyl ketone.

7. The method according to claim 3, wherein the polysaccharide is one selected from the group consisting of starch, dextrin, cellulose, sodium carboxymethyl cellulose, and sodium carboxymethyl starch.

8. The method according to claim 3, wherein the catalyst is at least one selected from the group consisting of copper sulfate, ferrous sulfate, and ferric sulfate.

* * * * *